April 4, 1939. C. R. HAUKE 2,153,467
PROCESS OF RECOVERING PRECIOUS METALS
Filed Oct. 21, 1938 6 Sheets-Sheet 1
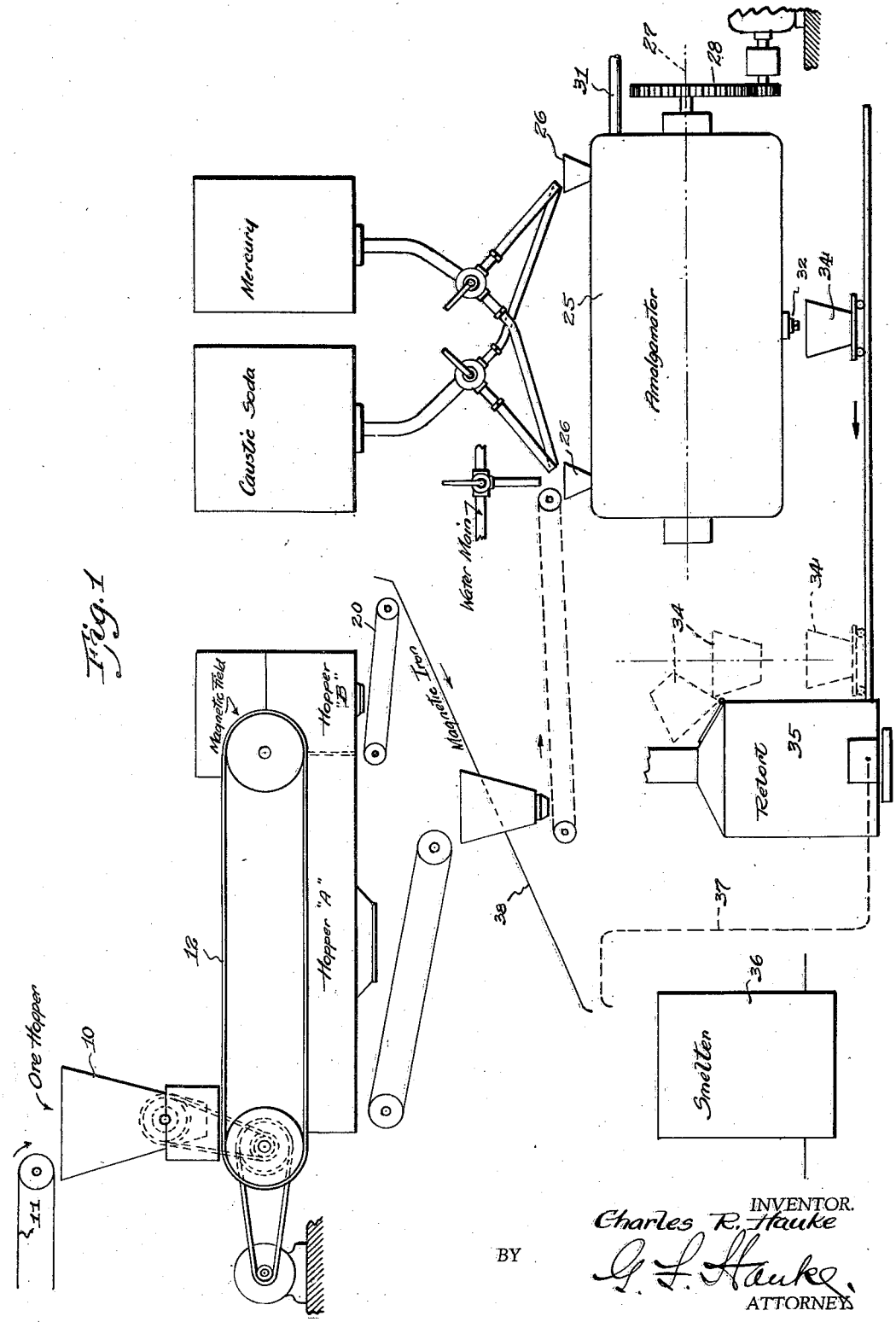
INVENTOR.
Charles R. Hauke
BY
G. L. Hauke
ATTORNEY

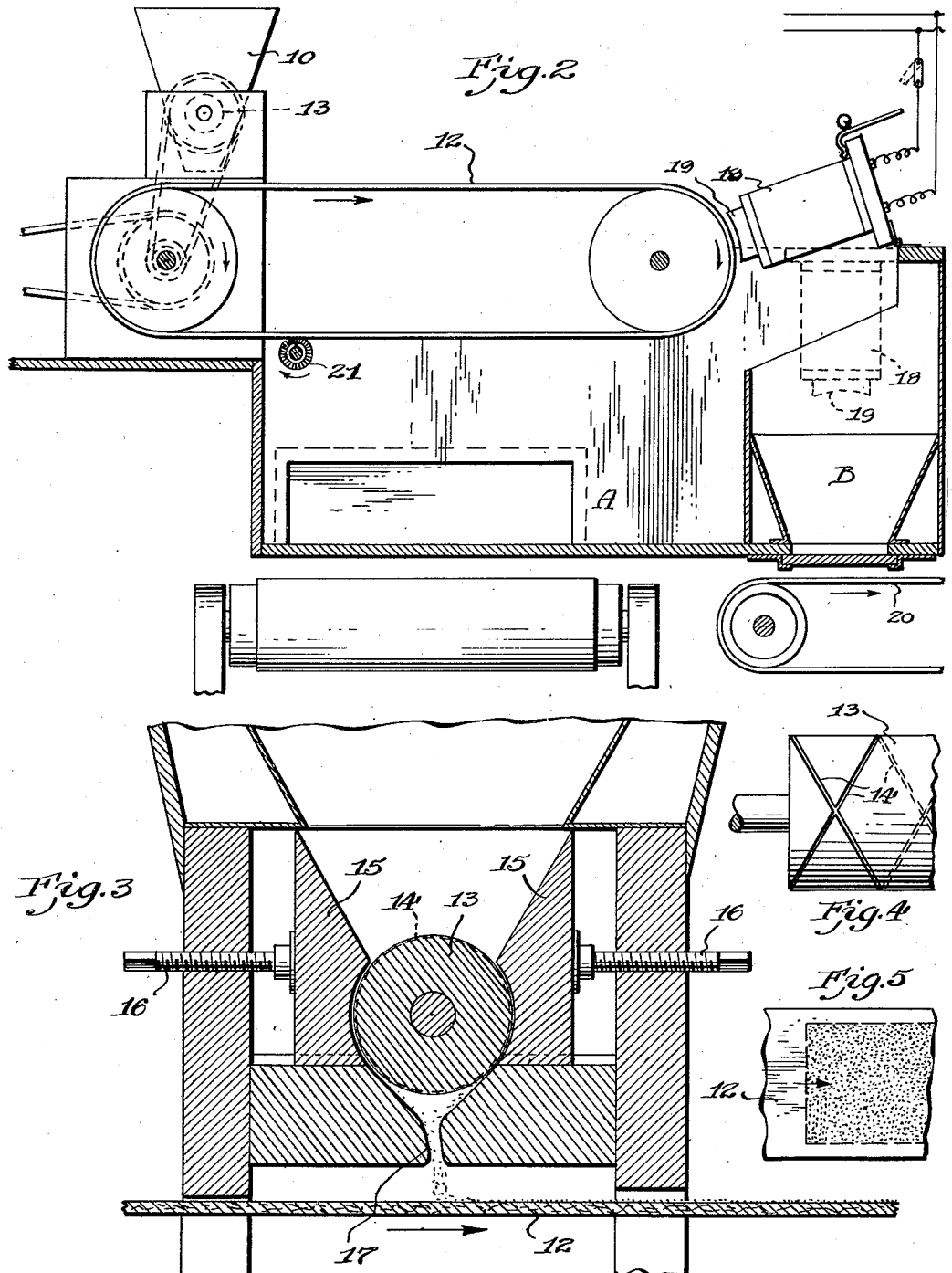

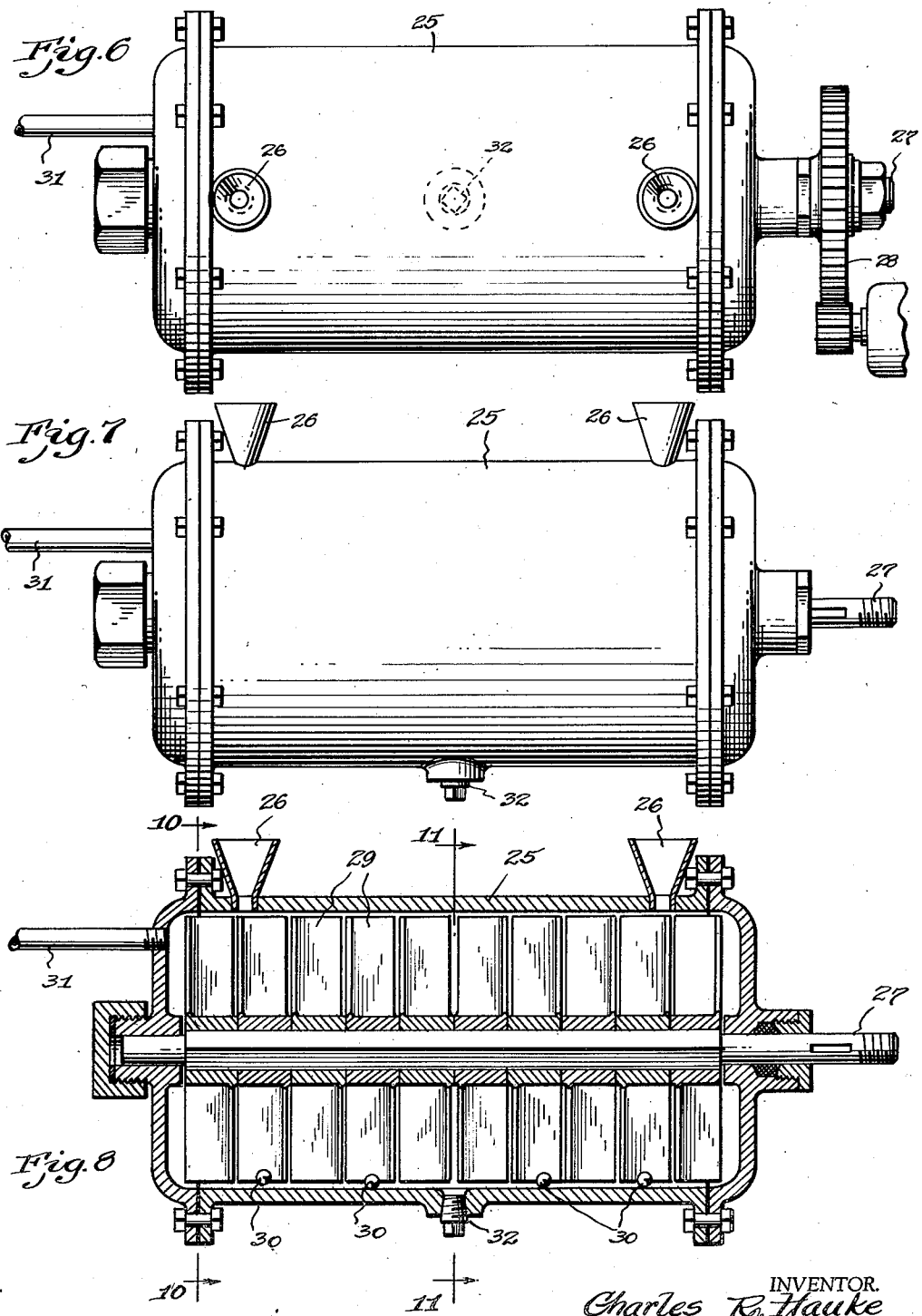

April 4, 1939.   C. R. HAUKE   2,153,467
PROCESS OF RECOVERING PRECIOUS METALS
Filed Oct. 21, 1938   6 Sheets—Sheet 4
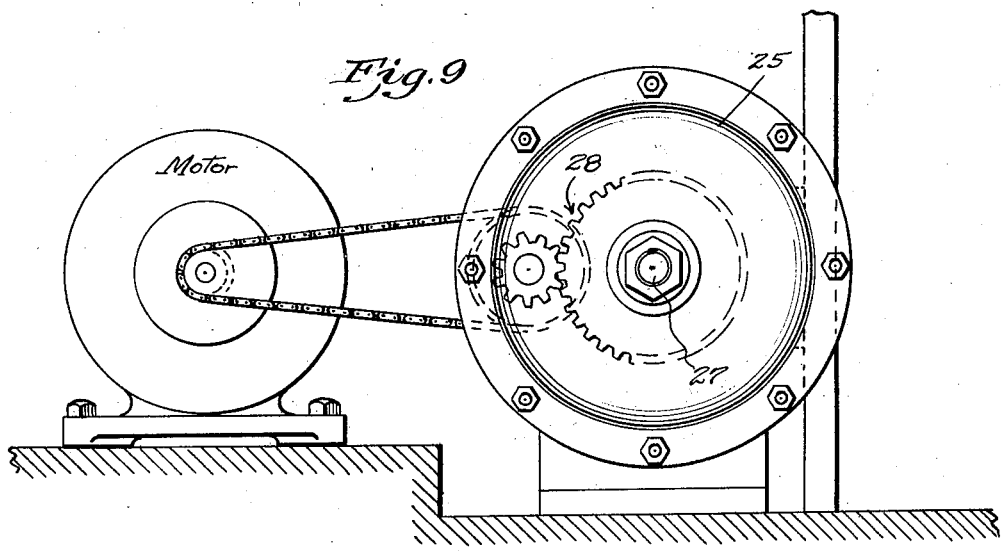
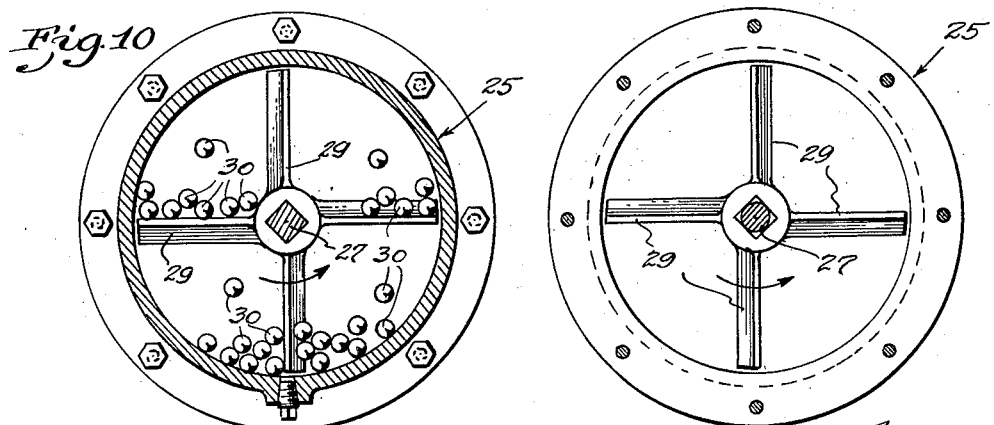
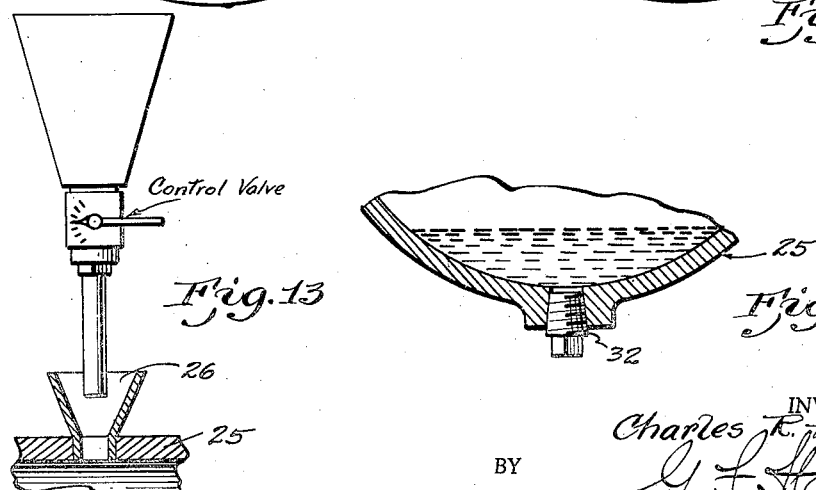
INVENTOR.
Charles R. Hauke
BY
ATTORNEY.

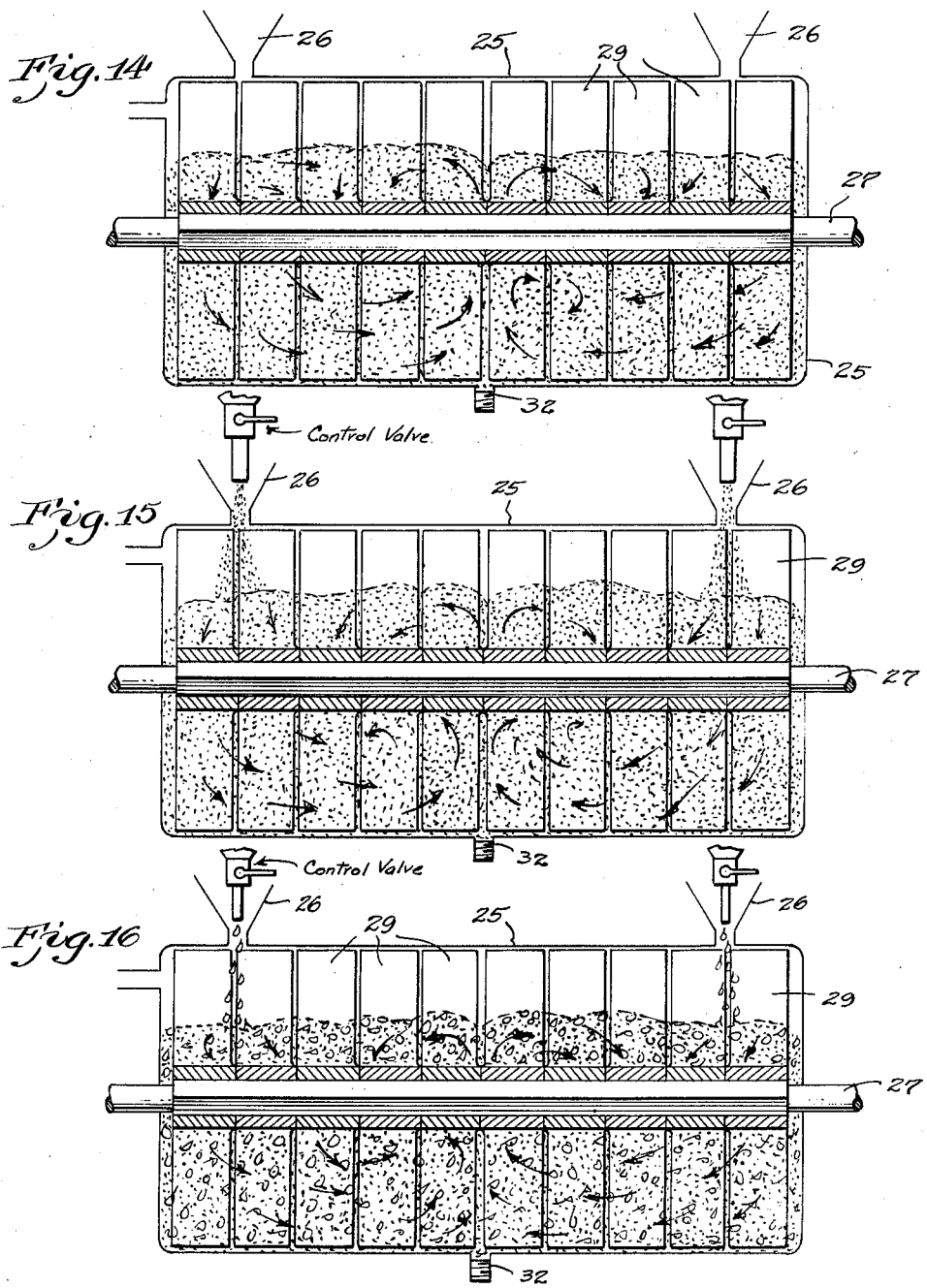

April 4, 1939. C. R. HAUKE 2,153,467
PROCESS OF RECOVERING PRECIOUS METALS
Filed Oct. 21, 1938 6 Sheets-Sheet 6
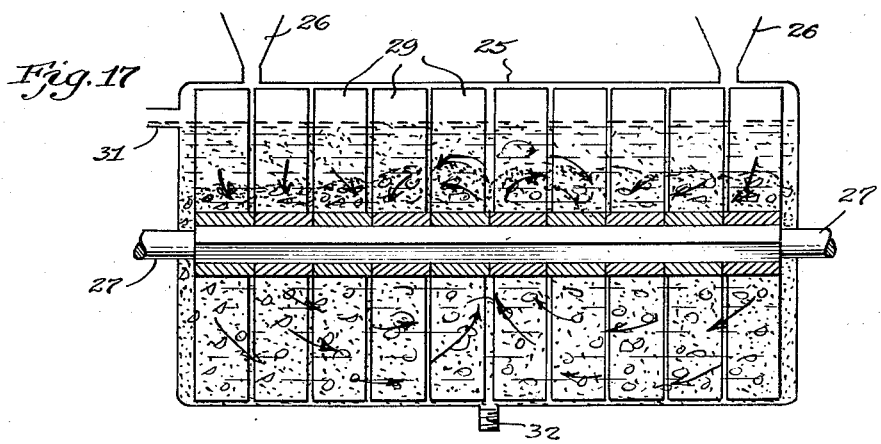
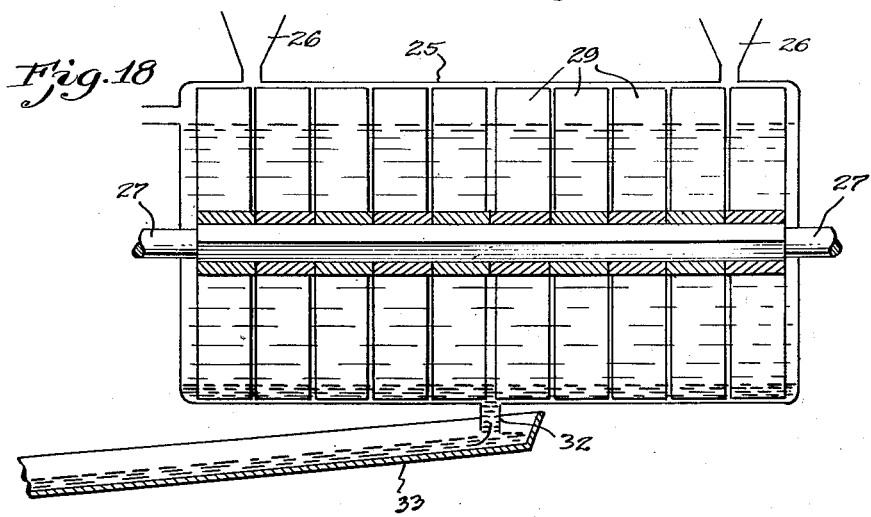
 
INVENTOR.
Charles R. Hauke
BY
G. F. Hauke
ATTORNEY.

Patented Apr. 4, 1939

2,153,467

UNITED STATES PATENT OFFICE 2,153,467

PROCESS OF RECOVERING PRECIOUS METALS

Charles R. Hauke, Royal Oak, Mich., assignor to National Metallurgical Laboratory, Royal Oak, Mich., a copartnership consisting of Charles R. Hauke, Raymond B. Hauke, John P. McHale, Frank A. McRath, and Zeno Schoolcraft Application October 21, 1938, Serial No. 236,329

4 Claims. (Cl. 209—175)

My invention relates to a process for the recovery of gold and/or other precious metals from a material bearing such precious metals in a finely divided natural state and in colloidal form and contained in a magnetic mineral, and more particularly it is my intention to employ my process for removing gold and other precious metals from selective deposits of earth, sand and gravel.

Although it has been known for a long time that gold and other precious metals are present in many gravel pits, it has heretofore been impractical to extract such gold and precious metals, because it has been heretofore possible to only extract a very small percentage of said precious metals, which has been inadequate for economical processing. With my improved process, I am able to recover substantially 85% of the precious metal deposits and therefore I have devised means which make it profitable to process the material.

It will be noted that various critical steps are involved in my process, and these steps all cooperate to successfully process the precious metal from the earth, sand and gravel bearing these precious metal deposits, and portions of the process are alone applicable to other processes, so therefore in some of the appended claims it will be noted that subcombinations involving only a portion of the many process steps are set forth as novel combinations.

Although it has been well known that mercury may be used as an agent in extracting these precious metals from earth, sand and gravel, it has been difficult to obtain good results as the proposals offered heretofore did not bring all the gold or other precious metals in intimate contact with the mercury. Various means have been devised for breaking up the mercury by agitation to accomplish this result without much success. I have devised a simple method of successfully carrying out this process of extracting gold and other precious metals from earth, sand and gravel, which process is profitably used.

It has heretofore been proposed to employ caustic alkalis, such as caustic soda and caustic potash, in amalgamation processes for the recovery of precious metals from their ores, but so far as I am aware they have always been introduced in the presence of quantities of free water which converted them into the respective hydroxides. Not only do these excess quantities of water render use of such processes unfeasible in arid regions where water is a premium—but in many of which large precious metal deposits exist which can be profitably worked if excessive quantities of water are not required which would have to be hauled in—but as experiments conducted by me have shown, the quantity of water employed may, and according to the present invention does, play a very important part in the percentage of recovery of the precious metals present.

My experiments have shown that when caustic soda, for example, is introduced into an amalgamator in the presence of free water whereby sodium hydroxide is formed, while the mercury employed for amalgamation may be broken up into globules by the action of the amalgamator, such globules still exhibit the normal tendency of mercury to agglomerate or re-combine into larger drops each time they touch one another. This makes it difficult if not impossible to secure contact between the mercury and all of the precious metal particles, the more especially because in the liquid or semi-liquid state of the ore due to the large quantity of water present, the mercury, because of its great specific gravity, is always tending to collect in a pool at the bottom of the amalgamator. As a result, recovery by these processes rarely exceeds from 50% to 60%, which is too low a percentage to make the working of many low grade ores profitable.

From a practical standpoint it is desirable to work the ores wet rather than dry, but in arid regions, as above indicated, it is almost imperative not to use any more water than is absolutely necessary. From my experiments I have determined that if after suitable pulverization the precious metal bearing material be wetted only to approximately the exact point of saturation, and then agitated in an amalgamator along with mercury and a caustic alkali such as caustic soda, not only may the excess or free water heretofore deemed necessary to be dispensed with, but also that under such conditions the mercury is divisible under the agitative action into much smaller globules than when caustic hydroxide solution is employed, and that these globules exhibit to a very marked degree a tendency to remain separate and independent even when brought into intimate contact with one another.

In such a state of relatively fine and maintained subdivision, the mercury may be the more easily worked completely through the mass, and the better brought into contact with all of the precious metal particles present, with the result that under my process it is possible to consistently recover as high as 85% of the precious metals present at a cost which makes it profitable to work many low grade deposits which can not be profitably worked in any other manner. The fine and maintained subdivision of the mercury of course presents a greatly increased surface area for contact with the precious metals, which enables the mercury to complete the extraction of the said precious metals in much less time than where the globules are larger, and this coupled with the use of relatively inexpensive caustic soda and a minimum amount of water keeps the cost of the process relatively low. Substantially all of the mercury can be recovered and used over and over again, as can also a large proportion of the water.

An object of my present invention is to economically extract gold and other precious metals from earth, sand and gravel by employing a process involving a method whereby the mercury is definitely broken up into extremely small globules and agitated to bring same into intimate contact with the precious metal deposits.

Another object of my invention is to extract this gold and other precious metals from earth, sand and gravel by first bringing the water content of the material to approximately the exact point of saturation, then introducing caustic soda and mercury, and agitating the mass.

Other objects of my invention pertain to the various steps for accomplishing this result in an economical manner, and involves the processing of the earth, sand and gravel, and the subsequent processing of the materials to extract a maximum amount of the precious metal deposits.

For a more detailed understanding of my invention reference may be had to the accompanying drawings illustrating preferred embodiments thereof, and in which, Fig. 1 is a view diagrammatically illustrating the layout of my improved process and which illustrates substantially every step of the process involved.

Fig. 2 is a side view, somewhat diagrammatic of the extractor apparatus employed in the process of treating the powdered earth, sand and gravel containing deposits of precious metals.

Fig. 3 is a detailed sectional view of the material spreading device employed in the first step of my process, and which is operated to substantially uniformly spread the material to be processed over a traveling conveyor.

Fig. 4 is a fragmentary detail view of the spreader roller.

Fig. 5 is a fragmentary detail view of the conveyor showing the material uniformly spread on same.

Fig. 6 is a top plan view of the amalgamator and drive therefor.

Fig. 7 is a side elevational view of the amalgamator.

Fig. 8 is a vertical longitudinal sectional detail view of the amalgamator.

Fig. 9 is an end elevational view of the amalgamator showing the drive in detail.

Figs. 10 and 11 are transverse sectional views taken substantially on the lines 10—10 and 11—11 of Fig. 8 respectively.

Fig. 12 is a fragmentary detail view of the amalgamator showing how the mercury accumulates in a pool at the bottom thereof.

Fig. 13 is a fragmentary detail view of a means for controlling the admission of the several materials into the drum.

Fig. 14 is a detail diagrammatic view of the amalgamator showing how the material is mechanically agitated.

Fig. 15 is a similar diagrammatic view illustrating a further step in the process, namely the adding of the caustic soda.

Fig. 16 is a similar diagrammatic view showing how the mercury is added to the agitated mixture.

Fig. 17 illustrates diagrammatically the flushing of the amalgamator.

Fig. 18 illustrates diagrammatically the draining off of the mercury bearing the precious metals in solution.

Figs. 19 to 23 diagrammatically illustrate the successive steps of the process employed in extracting the precious metals from the material.

Briefly my improved method of extracting precious metals from earth, sand and gravel includes various process steps, and the first step is to crush, pulverize and screen said earth, sand and gravel by any well known process, and I find it preferable to pulverize the material to a fineness that will pass a 60 mesh screen, although quite satisfactory results may be obtained in using material of 50 to 100 mesh. The actual pulverizing of the material forms no part of the present invention.

This finely pulverized material is discharged or fed into a hopper 10 from any suitable conveyor 11, and is then spread onto a conveyor 12 which carries same through a magnetic field produced by electro or permanent magnets, the magnet attracting any magnetic mineral from said material (see Fig. 1). The magnetic mineral, usually magnetic iron, is discharged into the hopper "B" while the remainder of the material is discharged into hopper "A".

The hopper 10 has preferably associated therewith any suitable form of spreading device for uniformly spreading the material onto the conveyor or belt 12. In order to illustrate my method of operation, I have provided said hopper 10 with a grooved roller 13, said roller being preferably spirally grooved as at 14 (Fig. 4). The hopper 10 is supported in any suitable frame or support, which support adjustably supports the shoes 15 which are adjusted towards or away from the roller 13 by suitable adjustable screws 16 or other devices, in order to regulate the discharge of the pulverized material particles through said discharge opening 17. The speed of the roller actually used in the present apparatus is approximately 2 R. P. M. while the speed of the conveyor or belt is preferably about 6 linear feet per minute. Obviously the speed of the roller 13 is somewhat dependent on the size of the roller and the speed of the belt 12. I find it necessary for the successful processing of this material to uniformly spread the material by depositing a very thin film of the material on the moving belt 12, preferably in a single layer so that no particles of said material rest on top of another. Therefore, the diameter of the roller 13, the adjustment of the clearance between the shoes 15 and the roller, and the speed of the belt 12, may be varied or adjusted in order to obtain the desired result.

The conveyor or belt 12 carries this uniformly spread pulverized material through a magnetic field produced by an electromagnet 18 or any other suitable source of magnetic energy. The soft iron pole member 19 of the magnet means is preferably positioned closely adjacent to the belt surface carrying the pulverized material, and the magnet therefore attracts any magnetic mineral particles and extracts same from said pulverized material. Said magnet may be moved away from the belt as shown by the dotted lines in Fig. 2, then demagnetized so as to discharge the magnetic mineral particles into hopper "B"

from whence same can be discharged onto a suitable conveyor 20 as desired. A brush or scraper 21 is actuated to sweep or scrape the belt on its return travel, and all the remainder of the powdered material is deposited into the hopper "A" after the magnetic mineral particles are extracted. It will be understood that in so far as the present entire method or process is concerned the magnetic mineral particles may be extracted by any suitable process but I have found that the present apparatus satisfactorily removes a very large percentage of the magnetic mineral particles from said material.

The magnetic mineral particles, usually magnetic iron extracted from said material are stored away to be later processed or smelted down, while the remainder of the material is further processed in an amalgamator before being smelted down. However, prior to feeding the material from which the magnetic mineral particles have been extracted, and which contains precious metal deposits in a finely divided natural state and in colloidal form, the material is saturated with water.

I find that the best results are obtained by mixing this material to the exact point of saturation. Preferably this material is never saturated in excess of about 1/20 to 1/10 of 1% in excess of the exact point of saturation.

By the exact point of saturation, as the term is herein used, is meant the point at which water is present in the ore in quantity just sufficient to fill any interstices in the ore particles, provide a water film held by surface tension upon the surfaces of the particles, and fill the interstices between the particles to the limit of capillary action. Such water will not be absorbed by or form a solution of caustic soda to any appreciable or detrimental extent; but water above such an amount is excess or free water which may and will form a sodium hydroxide solution if caustic soda be introduced to it.

This saturated material consisting of pulverized earth, sand and gravel bearing deposits of precious metals is loaded into the amalgamator, which comprises a drum 25 provided with top inlet openings 26 at both ends of the drum. A paddle shaft 27 is supported in suitable bearings and is driven by any suitable source of power through a speed reducing mechanism 28. Paddles 29 are secured to said shaft 27, and it will be noted that a plurality of closely positioned paddles are used. The paddles to one side of the midsection of said amalgamator drum are oppositely pitched with respect to the paddles to the other side of the midsection. These paddles are slowly revolved, preferably about 20 R. P. M. and the speed of these paddles is preferably controlled to revolve at speeds not less than 10 R. P. M. and not more than 30 R. P. M., however, a speed of 20 R. P. M. is considered desirable. A plurality of balls 30, possibly several hundred in number, depending on the size of the amalgamator may also be employed for cooperative actuation with the paddles to thoroughly break up the mass of material being processed. These paddles and balls mechanically agitate the mass of material in the drum, the oppositely pitched paddles causing the material to move towards the midsection of the drum from both ends, and to be folded over at said midsection. The water saturated pulverized earth, sand and gravel is preferably fed into the amalgamator drum very slowly until said drum is filled approximately two-thirds (2/3) full (Fig. 14).

After all the predetermined amount of material, which contains these deposits of precious metals, is fed into the amalgamator drum 25, a small percentage of caustic soda is slowly fed into the drum from both ends (Fig. 15), this caustic soda slowly mixing with the saturated material and is thoroughly distributed throughout the mass being agitated in said drum.

Then mercury is slowly fed into the mixture through the inlet openings from both ends of the drum (see Fig. 16) and the mass slowly agitated and thoroughly mixed, the material being slowly moved towards the midsection of the drum and there folded over upon itself. This mechanical agitation and mixing is continued for approximately two (2) or three (3) hours, preferably about two and one-half (2½) hours. This period of time is deemed to be sufficient to thoroughly mix the said elements together and during this time practically all the particles of precious metals, such as gold and silver, are brought into intimate contact with the globules. The particles of free gold and silver or other precious metals are thus held in intimate contact with the globules for a length of time sufficient to permit said precious metal particles to be absorbed thereby.

The next step in the process consists in the recovery of the mercury which has absorbed the precious metal deposits, this being preferably accomplished by adding excess quantities of water to said amalgamator (Fig. 17). Preferably this excess water is fed into the drum slowly at first so as to thoroughly moisten the entire mass of material, the water overflowing through the water outlet 31. The water serves to wash out the residue material and caustic, allowing the heavy mercury to collect in a pool at the bottom (see Fig. 18). The flushing of the drum is continued until the discharged water becomes clear or substantially so, thus indicating that substantially all of the residue material has been washed out of the amalgamator.

Figs. 19 to 23 diagrammatically illustrate these various steps of my method for processing the pulverized earth, sand and gravel to extract the precious metals therefrom, the figures illustrating how the fine particles of material are brought into intimate contact with the globules.

I have established that these materials must be mixed together according to certain proportions, and I have found it desirable to add mercury to said material in the proportion of about 10% to 40% by weight and preferably about 25% and to add a relatively small amount of caustic soda, about ½% to 1½% by weight of the mercury and preferably 1%. The mercury globules added to this mixture are preferably in globules about the size of a pin head, to wit, about 1/32 to 1/64 inch in diameter. I have also found that the proportions of the drum have much to do with the thorough mixing and I preferably employ a drum which has a length substantially twice the diameter.

The mercury accumulated in a pool in the bottom of the drum 25 is preferably drained off through the outlet 32 and thence conveyed by a chute 33 or any suitable conveyor means, such as buckets 34 (Fig. 1) to a retort 35. The mercury is distilled off leaving a residue in the retort bearing a relatively high percentage of precious metal.

As shown in Fig. 1, this residue is then conveyed by any suitable means to a smelter 36 as indicated at 37. The magnetic mineral particles usually magnetic iron are also conveyed to this smelter as indicated at 38. The residue and magnetic mineral are then smelted down to recover the precious metal. Any suitable type of retort and smelter may be used.

Wherever caustic soda is mentioned herein, it will be understood to refer to the commercially well known dry powered or granular material, or dehydrated NaOH, and not a solution thereof.

It will thus be seen that I have devised an improved method for recovering gold, silver and other precious metals, which method has been successfully operated to extract approximately 85% of the precious metal contained in said material to be processed, as shown by assays. Heretofore, it has only been possible to extract a very low percentage of the precious metals contained in these earth and gravel deposits, and such methods as have heretofore been proposed have not been such as to make it practical to work these earth and gravel deposits.

It will be obvious that various modifications and changes may be incorporated in my method, without departing from the spirit of the appended claims.

I claim:

1. In a process for extracting precious metals from materials containing deposits of the same, the steps which consist in providing a batch of said material containing water to approximately the exact point of saturation of the material; then introducing caustic soda and mercury into said saturated material; and agitating the mass.

2. In a process for extracting precious metals from pulverized materials containing the same, the steps which consist in supplying water to said material to approximately the exact point of saturation of the material; then introducing caustic soda into and agitating the mass; and then introducing mercury into and agitating the mass.

3. In a process for extracting precious metals from pulverized materials containing the same, the steps which consist in providing a batch of said material containing water to approximately the exact point of saturation; then successively introducing caustic soda and mercury into said material, the mercury in an amount equal to from 10% to 40% by weight of the material, and the caustic soda in an amount equal to from ½% to 1½% by weight of the mercury; and agitating the mass.

4. In a process for extracting precious metals from materials containing deposits of the same, the steps which consist in pulverizing the material to a fineness of from 50 to 100 mesh; then bringing the water content of said pulverized material to approximately the exact point of saturation; then introducing caustic soda into said material in an amount equal to approximately 0.25% by weight of the material; agitating the mass to distribute said caustic soda throughout the material; then introducing mercury into the mass in an amount equal to approximately 25% by weight of said material; and agitating the mass for from 2 to 3 hours.

CHARLES R. HAUKE.